May 5, 1959 — C. P. TOOHEY — 2,885,214
WHEEL ATTACHMENT FOR SLEDS
Filed Oct. 24, 1956

INVENTOR.
CLARENCE P. TOOHEY
BY R. E. Meech
ATTORNEY

United States Patent Office 2,885,214
Patented May 5, 1959

2,885,214

WHEEL ATTACHMENT FOR SLEDS

Clarence P. Toohey, Townville, Pa.

Application October 24, 1956, Serial No. 618,150

6 Claims. (Cl. 280—8)

This invention relates to sleds and, more particularly, to an improved device or wheel attachment for a conventional sled of the metal runner type whereby the sled may be converted into a coaster or wheeled vehicle.

It is the general object of the present invention to provide an improved detachable means or device for use with a flexible runner sled whereby the sled may be used in the conventional manner for movement over slippery surfaces or may be converted to a wheeled vehicle for use over surfaces that are not slippery.

It is another object of the invention to provide such an attachment or device for sleds which may be easily and quickly assembled in position on the sled so as to be securely attached thereto.

It is a further object of this invention to provide an improved wheeled attachment or device for sleds which is simple and inexpensive in its construction, and efficient and effective, as well as safe in its use.

Various other objects and advantages of this invention will be more apparent in the course of the following specification and will be particularly pointed out in the appended claims.

In the accompanying drawings, there is shown for the purpose of illustration, an embodiment which my invention may assume in practice.

Figure 1:
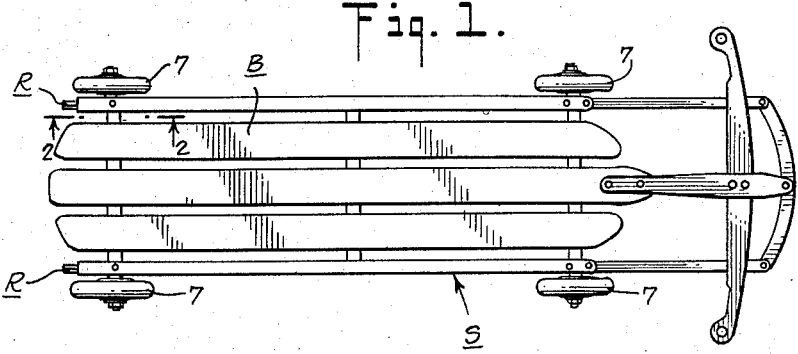
Figure 2:
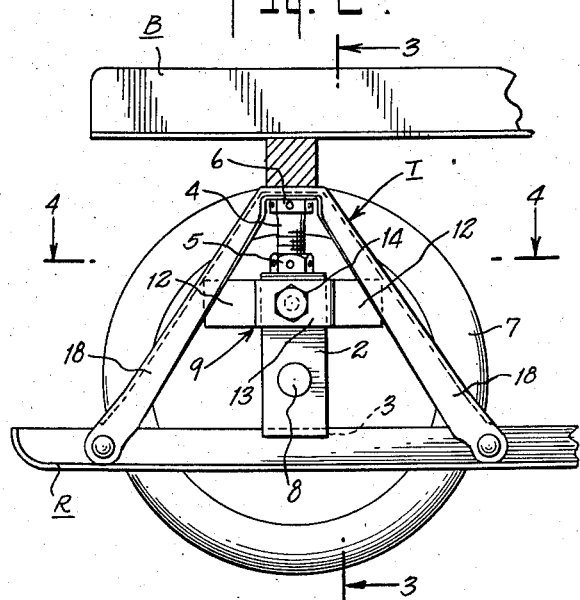
Figure 3:
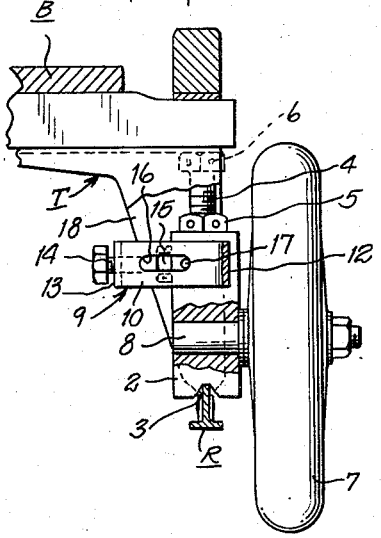
Figure 4:
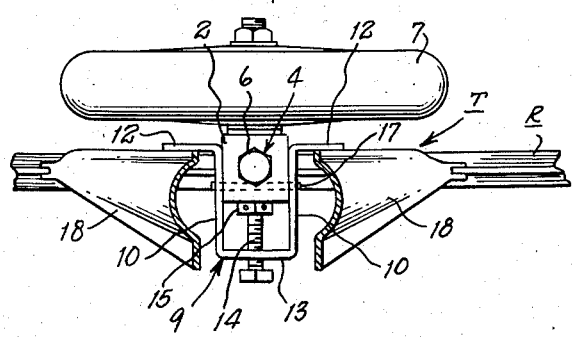

In these drawings:

Fig. 1 is a plan view of a sled equipped with the improved device in accordance with the present invention, Fig. 2 is an enlarged sectional view taken on line 2—2 of Fig. 1, Fig. 3 is a sectional view taken on line 3—3 of Fig. 2, and Fig. 4 is a sectional view taken on line 4—4 of Fig. 2.

Referring more particularly to the drawings, there is shown in Fig. 1 a conventional sled S which is equipped with four of the improved devices of my invention. Such a sled consists generally of a pair of spaced-apart runners R having a bed B which is supported at a spaced distance above the runners R by means of a series of substantially inverted V-shaped struts T.

As more clearly shown in Figs. 2, 3 and 4 of the drawings, the improved device of my invention consists of a block-like body member 2 having a groove 3 arranged in the lower end thereof in which the upper side of the runner of the sled is adapted to be disposed. In the upper end of the body member 2, there is arranged a screw or bolt 4 having a lock nut 5 arranged thereon. The head 6 of the bolt is adapted to bear against the underside of the bed B of the sled, as more clearly shown in Fig. 2.

On the outer side of the body member 2, there is arranged preferably a rubber tired wheel 7 with the periphery thereof adapted to extend below the runner of the sled when the device is assembled thereon. This wheel 7 is rotatably mounted on suitable bearings on the outer end of a stud shaft 8 which is secured to the body member 2.

On the inner side of the body member 2, there is arranged substantially a U-shaped bracket member 9 having spaced-apart side walls 10 terminating in a pair of oppositely disposed extensions 12. This U-shaped bracket member has an outer wall 13 in which there is threadedly arranged a screw or bolt 14 having a lock nut 15 arranged on the inner end thereof which bears against the inner side of the body member.

Each of the side walls 10 of the U-shaped bracket 9 is preferably slotted, as at 16, and there is provided a pin 17 which extends through the body member 2 transversely thereof. The ends of this pin 17 are disposed in the slots 16 so as to aid in positioning and holding the bracket member 9 on the body member.

It will be understood that it is customary to use four devices or wheels of my invention on a sled in order to convert it into a rolling vehicle and each one of these devices is assembled on the sled in the following manner. The block-like body member 2 of the device is positioned between the vertically extending leg portions 18 of the strut T substantially centrally thereof so as to be positioned substantially in a vertical plane. The screw or bolt 4 is then turned or adjusted until the head 6 bears against the under side of the bed B of the sled. The lock nut 5 is then tightened so as to attach securely the device in position. The bolt or screw 14 carried by the bracket 9 is then tightened so that the extensions 12 of the U-shaped bracket member 9 bear firmly against the outer sides of both of the leg portions 18 of the strut member T. The lock nut 15 is then tightened locking firmly the body member in position and so as to prevent horizontal displacement thereof.

It will be apparent that my detachable wheeled device or attachment can be easily and conveniently applied to any conventional flexible runner sled or any sled having T-shaped runners.

As a result of my invention, it will be seen that my improved device may be inexpensively manufactured, and it will be further seen that due to the construction thereof, it may be securely fastened to the runner and sled so that any accidental dislodgment or displacement thereof is eliminated.

While I have shown and described an embodiment which my invention may assume in practice, it will be understood that this embodiment is merely for the purpose of illustration and description, and that other forms may be devised within the scope of my invention as defined in the appended claims.

What I claim as my invention is:

1. A device for sleds of the type having a pair of spaced-apart runners with a bed supported thereon at a spaced distance thereabove by means of a series of strut-like members comprising a body member adapted to be arranged vertically between the top of the sled runner and the bed of the sled adjacent any one of the strut-like members, means arranged on the lower end of said body member for engaging the top of the sled runner, adjustable means arranged on the upper end of said body member for engaging the under side of said bed, a transversely extending member movably attached to said body member and which is adapted to engage the strut for preventing lateral displacement of said body member, means for adjusting said transversely extending member relative to said body member, and a wheel rotatably arranged on the outer side of said body member having the periphery thereof extending below the sled runner.

2. A device for sleds of the type having a pair of spaced-apart runners with a bed supported thereon at a spaced distance thereabove by means of a series of substantially inverted V-shaped strut-like members comprising a body member adapted to be disposed centrally of a strut-like member and extending vertically between the runner and said bed, means arranged on the lower end of said body member for engaging the top of the sled runner, an adjustable bolt arranged in the upper end of said body member having a head which is adapted to engage the under side of said bed, a lock nut arranged on said bolt, a transversely extending member movably attached to said body member and which is adapted to engage a strut-like member for preventing lateral displacement of said body member, means for adjusting said transversely extending member relative to said body member, and a wheel rotatably arranged on the outer side of said body member having the periphery thereof extending below the sled runner.

3. A device for sleds of the type having a pair of spaced-apart runners with a bed supported thereon at a spaced distance thereabove by means of a series of substantially inverted V-shaped strut-like members comprising a body member adapted to be disposed centrally of a strut-like member and extending vertically between the runner and said bed, means arranged on the lower end of said body member for engaging the top of a sled runner, adjustable means arranged on the upper end of said body member for engaging the under side of said bed, a wheel rotatably arranged on the outer side of said body member having the periphery thereof extending below the sled runner, a transversely extending member movably attached to said body member and which is adapted to engage the strut-like member for preventing lateral displacement of said body member, and means for adjusting said transversely extending member relative to said body member.

4. A device for sleds of the type having a pair of spaced-apart runners with a bed supported thereon at a spaced distance thereabove by means of a series of substantially inverted V-shaped strut-like members comprising a body member adapted to be disposed centrally of a strut-like member and extending vertically between the runner and said bed, means arranged on the lower end of said body member for engaging the top of the sled runner, an adjustable bolt arranged in the upper end of said body member having a head which is adapted to engage the under side of said bed, a lock nut arranged on said bolt, a wheel rotatably arranged on the outer side of said body member having the periphery thereof extending below the sled runner, means carried by the body member engageable with said strut-like member for preventing lateral displacement of said body member consisting of a substantially U-shaped bracket member having a pair of oppositely disposed extensions, said U-shaped bracket member adapted to straddle said body member so that one extension is disposed to either side thereof and adapted to engage the leg portions of the strut-like member, and a bolt threadedly arranged in the outer side of said U-shaped bracket member having a lock nut arranged on the inner end thereof which bears against the inner side of said body member.

5. A device for sleds of the type having a pair of spaced-apart runners with a bed supported thereon at a spaced distance thereabove by means of a series of substantially inverted V-shaped strut-like members comprising a body member adapted to be disposed centrally of a strut-like member and extending vertically between the runner and said bed, means arranged on the lower end of said body member for engaging the top of a sled runner, adjustable means arranged on the upper end of said body member for engaging the under side of said bed, a wheel rotatably arranged on the outer side of said body member having the periphery thereof extending below the sled runner, means carried by said body member engageable with said strut-like member for preventing horizontal displacement of said body member consisting of a substantially U-shaped bracket member having a pair of oppositely disposed extensions, said U-shaped bracket member adapted to straddle said body member so that one extension is disposed to either side thereof and adapted to engage the leg portions of said strut-like member, and adjustable means for holding said U-shaped bracket on said body member and in engagement with said strut-like member.

6. A device for sleds of the type having a pair of spaced-apart runners with a bed supported thereon at a spaced distance thereabove by means of a series of substantially inverted V-shaped strut-like members comprising a body member adapted to be disposed centrally of a strut-like member and extending vertically between the runner and said bed, means arranged on the lower end of said body member for engaging the top of a sled runner, adjustable means arranged on the upper end of said body member for engaging the under side of said bed, a wheel rotatably arranged on the outer side of said body member having the periphery thereof extending below the sled runner, means carried by said body member engageable with said strut-like member for preventing horizontal displacement of said body member consisting of a substantially U-shaped bracket member having a pair of oppositely disposed extensions, said U-shaped bracket member adapted to straddle said body member so that one extension is disposed to either side thereof and adapted to engage the leg portions of the strut-like member, a bolt threadedly arranged in the outer side of said U-shaped bracket member having a lock nut arranged on the inner end thereof which bears against the inner side of said body member.

References Cited in the file of this patent

UNITED STATES PATENTS

| 1,456,335 | Peterson | May 22, 1923 |
| 2,549,003 | Pintak | Apr. 17, 1951 |

FOREIGN PATENTS

| 584,159 | France | Nov. 13, 1924 |